Feb. 7, 1961     K. F. ROSS     2,970,518
CATOPTRIC SYSTEM
Filed Dec. 29, 1958

INVENTOR:
Karl F. Ross

United States Patent Office 2,970,518
Patented Feb. 7, 1961

2,970,518

CATOPTRIC SYSTEM

Karl F. Ross, 1521 Post Road, Riverdale, N.Y.

Filed Dec. 29, 1958, Ser. No. 783,538

6 Claims. (Cl. 88—57)

My present invention relates to catoptric systems having two or more reflecting surfaces for controlling the path of light rays.

Catoptric elements (mirrors), unlike dioptric elements (lenses), do not disperse the light since the laws of reflection, in contradistinction to those of refraction, are independent of wavelength. This advantage, however, is outweighed by the unavoidable distortion introduced by any focal catoptric element as a result of the curvature of the locus of its focal points; while field curvature is also a problem in dioptrics, it can there be minimized or suppressed by cementing together lenses of different classes to form doublets or triplets.

It is known that a parabolic mirror will focus an incident beam of parallel light rays, passing in the direction of the parabola axis, onto a single point located on this axis whose distance from the vertex of the parabola equals half the radius of its osculatory circle. Conversely, a spherical mirror will focus a considerable portion of a beam of parallel light rays on a point corresponding to the focus of an osculatory parabola whose axis is parallel to the beam, this point thus being spaced from the mirror by a distance equal to half its radius. With beams of substantially parallel light rays impinging in various directions, as will usually be the case in both photography and telescopic observation, the parabolical mirror will be useless while the spherical mirror will concentrate the light of the various beams on respective focal points whose locus is a sphere is concentric with the mirror and has half its radius; in the case of a circularly cylindrical mirror that locus will, similarly, be a concentric cylinder. Since circles of different diameters can touch each other in only one point, the fields of differently curved catoptric elements can neither coincide nor osculate; with the conventional arrangement of such elements in afocal pairs it will, therefore, not be possible to provide satisfactory compensation for the deviation of their individual fields from a plane surface.

The general object of my present invention is to provide an improved catoptric system adapted to produce a substantially planar field without the intervention of dioptric elements.

Catoptric systems with two or more pairs of reflecting surfaces of cylindrical curvature are coming increasingly into use in anamorphotic systems for the taking and/or the projection of wide-screen motion-picture images. It is another object of my invention to provide an improved, low-distortion anamorphotic system utilizing only reflective surfaces.

Prior catoptric anamorphotic systems generally employed one or more afocal pairs of cylindrical mirrors of different size, the ratio of the mirror radii corresponding to the desired rate of anamorphotic magnification. A more specific object of my invention is to provide an anamorphotic system utilizing mirrors of substantially identical size and curvature in a combination enabling the selection of a desired anamorphotic magnification factor merely by a change in the relative positioning of these mirrors, thereby permitting standardization of manufacturing methods for mass-production purposes. More broadly, the invention also aims at providing similar advantages in a spherically effective afocal system.

The invention is based upon the realization that a catoptric element such as a spherically or cylindrically concave mirror, having a circularly arcuate cross section in a particular plane, will form a hyperbolical image of a line segment located within the confines of its focal circle in that plane, the osculatory circle of the hyperbola having a constant radius and a location determined by the distance of the line segment from the center of the focal circle; this osculatory circle constitutes in turn the virtual image of a line segment at finite or infinite distance reflected by a convex catoptric element whose cross section in the plane of the hyperbola is part of a circle embracing the aforementioned osculatory circle. With the aid of such a pair of respectively convex and concave reflectors, which by analogy with dioptric doublets may be referred to as a catoptric doublet, it is thus possible to provide a substantially plane image of an object; if that object is at infinity, the convex reflector will concentrically surround the osculatory circle of the hyperbola and will have twice its radius, being thus equal in diameter to the conjugate concave reflector.

Since the path of the light rays so reflected is reversible, I may provide a pair of catoptric doublets so positioned that the image planes of their concave elements coincide, thereby producing a focal or afocal system whose power or magnification ratio depends upon the relative positioning of the components. In an afocal system of this type it is possible to use two convex and two concave mirrors of the same radius of curvature.

The invention will be better understood from the following description given with reference to the accompanying drawing in which.

Figure 1:
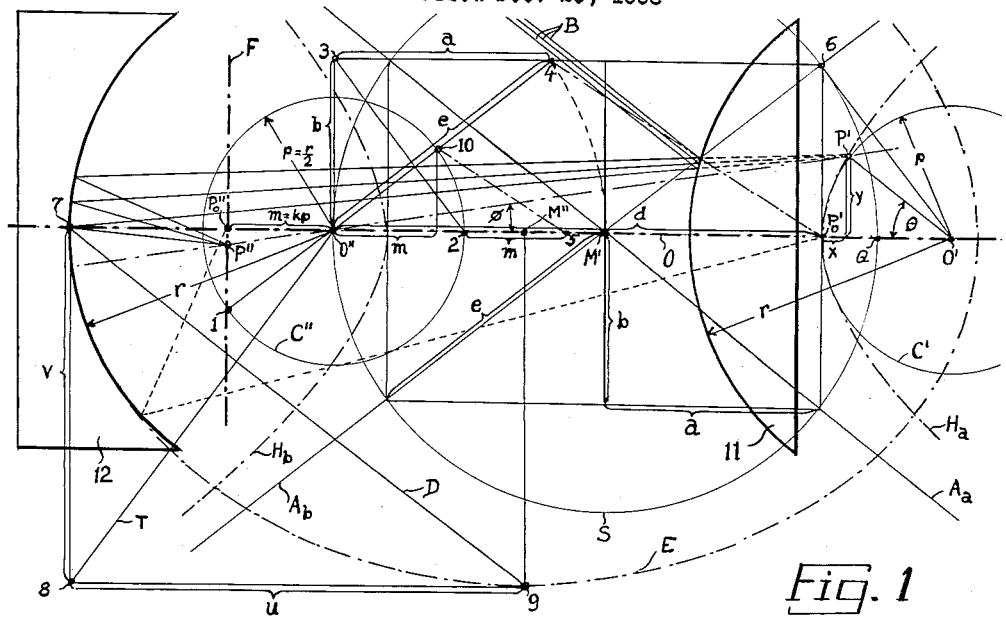
Fig. 1 is a diagrammatic view of a catoptric doublet according to the invention, used to explain the theoretical concepts involved.

Reference will first be made to Fig. 1 showing a convex mirror 11 and a concave mirror 12 which for purposes of the following discussion may be assumed to be cylindrical, the two mirrors having a common axial plane O and the same radius $r$; the axes of the two mirrors 11 and 12 have been indicated at O', O'', respectively.

At C' and C'' I have indicated the two focal circles of mirrors 11 and 12 which are concentric with these mirrors and have a radius $p=r/2$. Circle C' represents the locus of the virtual foci P' of different beams of parallel light rays, one of which is shown at B, impinging upon the mirror 11 within a limited angular range on either side of axial plane O; circle C'' represents the locus of the real foci of beams of similar rays incident upon mirror 12. This is so because the projections of the curved surfaces of mirrors 11 and 12 are the osculatory circles of two families of parabolas whose focal points lie on the circles C' and C'', respectively.

Circle C' is also the osculatory circle of a hyperbola, having branches $H_a$, $H_b$ and asymptotes $A_a$, $A_b$, whose image (referring only to the right-hand branch $H_a$) is a line segment lying in a plane F within the confines of circle C''; thus, the image of point P' appears as a point P'' on the projection of that plane. Thus, within the limits of substantial coincidence between osculatory circle C' and hyperbola branch $H_a$, the light rays incident upon mirror 11 from a distant object will converge on the plane F to form a semi-image of that object; if the mirrors were spherical rather than cylindrical, a complete image would come into existence.

In order to find the images P' of all the points P" within the region of interest, we must consider the curved projection of mirror 12 as the osculatory circle of a family of ellipses having the conjugate points P', P" as their foci. The principal ellipse E, having its major axis within plane O, has the axes $u$, $v$ and the foci $P_0'$, $P_0''$. As is well known, the center O" of the osculatory circle of such ellipse is found by drawing a diagonal D between the vertices 7 and 9 and, transversely to it, a line T passing through point 8 of the rectangle $u$, $v$. If we designate the distance from O" to $P_0''$ by $m=kp$ (where the coefficient $k$ is smaller than unity), and if $\phi$ be the angle between the axis O and the principal ray passing between points P", P' by way of O", then it can be shown that the co-ordinates $x$ and $y$ of point P' are given by the expressions $$x = dk\frac{1-\cos\phi}{\cos\phi - k} \text{ and } y = d(1-k)\frac{\sin\phi}{\cos\phi - k}$$

where $d$ denotes the distance between points O" and $P_0'$. These are the parameters of a hyperbola given by the equation $b^2(x+a)^2 - a^2y^2 = a^2b^2$ whose axes $a$ and $b$ will be found to have the values $$a = d\frac{k}{1+k} \text{ and } b = d\sqrt{\frac{1-k}{1+k}}$$

the focal circle S of the hyperbola, passing through the foci Q and O" thereof, has a radius $$e = \sqrt{a^2 + b^2} = \frac{d}{1+k}$$

If $\theta$ is the angle enclosed by the radius P'—O' with the axis O, this radius being parallel to the incident or reflected telecentric beam B, we can establish the relationship between $\phi$ and $\theta$ from the equations $$\frac{y}{d} = \sin\phi \text{ and } \frac{y}{p} = \sin\theta$$

whence, for small angles, $$\frac{\sin\theta}{\sin\phi} = \frac{\theta}{\phi} = \frac{k}{1-k}$$

since the distance $d$ is related to the radius $p$ by the expression $$d = \frac{kp}{1-k}$$

Thus it will be seen that the value of angle $\theta$ varies with the coefficient $k$, i.e. with the position of dot-dash line F along the horizontal radius of circle C". If $k=\frac{1}{2}$, the distance $d$ becomes equal to $p$ so that the vertex of mirror 11 coincides with point O". The radius of osculatory circle C', given by the expression $b^2/a$, is equal to $p$ in all positions of line F and is independent of $k$.

Given the positions of mirror 12 and line F, the location of mirror 11 along with the parameters of the ellipse E and the hyperbola $H_a$, $H_b$ can be found graphically as follows: First, draw the circle C" around the center O" of mirror 12 with a radius $p=r/2$. Next, intersect line F with circle C" to find the point 1 and produce the line 1—O" beyond its second intersection 10 with the circle. Through point 2, the intersection of circle C" with axis O, draw a perpendicular to line 1—10 and intersect it at 3 with the continuation of the vertical radius from O"; the distance O"—3 is the imaginary axis $b$ of the hyperbola. Next, draw a horizontal through point 3 and intersect it with line 1—10 to find the point 4, the distance 3—4 representing the real axis $a$ of the hyperbola; the distance O"—4 is the radius $e$ of the focal circle S and, when laid off from O" on axis O, gives the midpoint M' of the hyperbola. From this latter point, using the values previously found, the axial rectangle of the hyperbola may be drawn; the produced diagonals of this rectangle are the asymptotes $A_a$, $A_b$ of the hyperbola as is well known. As a check, the line extending from point 4 to the vertex $P_0'$ of the hyperbola must be parallel to a line extending from point 10 to a point 5 on the axis O whose distance from point 2 equals $m$. Finally, point O' can be found by drawing a parallel to the line 3—2 through the corner 6 of the axial rectangle and intersecting it with the axis O, the distance O'—$P_0'$ being of course equal to $p$.

The midpoint M" of the ellipse E lies halfway between points $P_0'$ and $P_0''$ and, by its distance from vertex 7, gives the major axis $u$ of the ellipse. The other vertex 9 of the ellipse can be found in the usual manner by laying off the distance $u$ from focal point $P_0''$ on the vertical through midpoint M".

Figure 2:
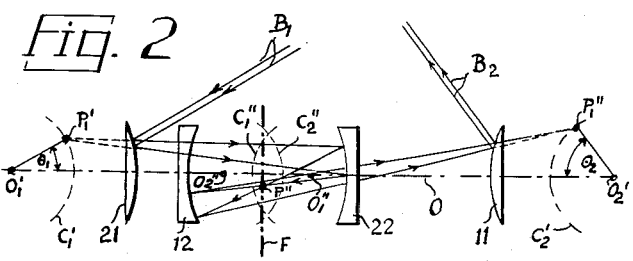
Fig. 2 is a top plan view of an anamorphotic system incorporating two doublets as shown in Fig. 1.
Figures 3, 4:
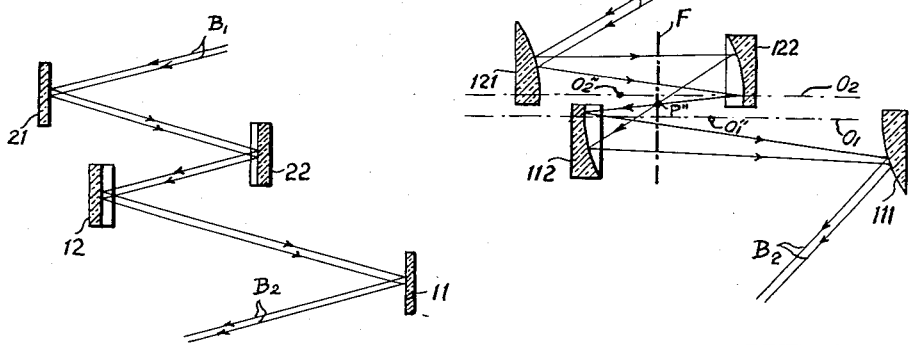
Fig. 3 is a sectional elevation of the system shown in Fig. 2.
Fig. 4 is a view similar to Fig. 3 but illustrating the application of the invention to a spherically effective system.

In Figs. 2 and 3 I have illustrated how two pairs of mirrors 11, 12 and 21, 22 can be used in an anamorphotic system to provide horizontal magnification. An incident beam $B_1$ of parallel light rays strikes the convex cylindrical mirror 21 to form a virtual image at a point $P_1'$ located on the focal cylinder $C_1'$ of mirror 21 centered on the axis $O_1'$. The rays of the beam now diverge horizontally until they strike the cylindrically concave mirror 22 from which they are reflected onto an image point P" on a vertical plane F; from this point the rays diverge again on their path to the cylindrically concave mirror 12, thereafter converging toward a point $P_1''$ on the focal cylinder $C_2'$ of convex mirror 11, centered on axis $O_2'$, which lies on a radius whose angle of inclination $\theta_2$ with respect to axial plane O is considerably larger than the corresponding angle $\theta_1$ of point $P_1'$. The rays are, however, intercepted by the cylindrically convex mirror 11 and are reflected by it as an outgoing telecentric beam $B_2$. The angles enclosed by beams $B_1$ and $B_2$ with axial plane O are, of course, equal to $\theta_1$ and $\theta_2$, respectively.

It will be noted that all of mirrors 11, 12, 21 and 22 have the same radii of curvature and that no two of them form an afocal pair in the conventional sense; thus, the focal cylinders $C_1''$, $C_2''$ of mirrors 12 and 22 do not touch but intersect, the point P" lying within the region of their intersection on the plane F which is closer to the axis $O_1''$ of mirror 22 than to the axis $O_2''$ of mirror 12. The difference between incident angle $\theta_1$ and outgoing angle $\theta_2$ results from this dissymmetry. The spacing between mirrors 11 and 12 and between mirrors 21 and 22 is critically related to the location of plane F as has been explained in connection with Fig. 1.

Although the mirrors 11, 12 or 21, 22 of each catoptric doublet should share a common axis, the two doublets need not be coaxial but may be axially offset from each other. This has been illustrated in Fig. 4 where a first doublet 121, 122 and a second doublet 111, 112 have been shown, the components of these doublets being truncated spherical mirrors with axes $O_1$ and $O_2$. An incident telecentric beam $B_1$, striking the convex mirror 121, diverges on its way to concave mirror 122 and, after reflection at the latter, converges at a point P" on image plane F; thereafter its rays diverge again, are reflected at concave mirror 112 and converge toward convex mirror 111, to be transformed into an outgoing beam $B_2$ of parallel light rays. Plane F, it will be noted, again lies closer to the center $O_1''$ of mirror 122 than to the center $O_2''$ of mirror 112, this dissymmetry accounting for the different elevations of the beams $B_1$ and $B_2$; it will be understood that these beams will at the same time undergo horizontal focusing and defocusing as illustrated in Fig. 2. The foreshortening of the spherical reflectors in Fig. 4, in particular of the concave mirrors 112 and 122, reduces the angle of incidence required for the rays to bypass these internal mirrors.

Although reference has been made above primarily to telecentric beams, i.e. to beams of parallel light rays as emitted by an object located at infinite distance, it should be understood that catoptric doublets similar to those described above and shown in the drawing may also be used in focal systems. Thus, if the beam B in Fig. 1 originated at an object within finite distance, the virtual image of such object would be not on the circle C' but on an ellipse centered on O' whose minor axis would be equal to $p$ and whose major axis would be less than $r$. Such an ellipse would have an osculatory circle smaller than C' and positioned to the left thereof in Fig. 1, it being then necessary to replace mirror 12 by a similar mirror of smaller radius of curvature (equal to twice the radius of the aforesaid osculatory circle) and to position it at the proper distance from the vertex of the ellipse in order to maintain the image within plane F. These variations are equally applicable to incident and to outgoing beams, hence the plane F may be regarded as either an image plane or an object plane. Furthermore, if such object plane were displaced parallel to itself beyond the location of point O'', the resulting image would change from a hyperbola to an ellipse; thus, an object positioned along a line tangent to circle C', i.e. the line 6—$P_0'$, would give rise to an elliptical image having its vertex at $P_0''$. Geometrical considerations may make it difficult to position the convex mirror 11 so close to concave mirror 12 that its focal circle C' coincides with the osculatory circle of such ellipse; the various inversions referred to, however, should be borne in mind since they enable the system of the invention to be used also under conditions in which the original object is not flat but curved. In its broader aspects, therefore, the invention will be seen to reside in the juxtaposition of a circularly convex and a circularly concave catoptric element in such manner that the real or virtual image of a given object, as reflected by one of these elements, osculates a conic section representing the image of a straight line segment as reflected by the other element. Within this definition, the invention is susceptible of various modifications and adaptations which will be readily apparent to persons skilled in the art and are intended to be embraced in the scope of the appended claims not specifically limited otherwise.

I claim:

1. A catoptric doublet comprising a circularly convex first reflecting element and a circularly concave second reflecting element axially aligned with said first element, the curved surfaces of said elements facing each other and having substantially the same radius of curvature $2p$, the spacing between the centers of curvature of said surfaces being substantially equal to $d+p$ wherein $$d=kp/(1-k)$$

$k$ being a positive factor of a magnitude less than unity.

2. An optical system for focusing a distant object upon a predetermined image plane, comprising a circularly convex first catoptric element positioned to form an image of said object along a curve substantially coinciding with part of a circle concentric with the convex surface of said first catoptric element and having substantially half the radius of said surface, and a circularly concave second catoptric element positioned to form an image of said plane along a conic section osculating said circle, the concave surface of said second catoptric element having a radius $2p$ substantially equaling that of said convex surface, the distance $d$ between said circle and the center of curvature of said concave surface being substantially equal to $kp/(1-k)$ wherein $k=m/p$, $m$ being the spacing of said image plane from said center of curvature and being smaller than $p$, said image plane being situated between said concave surface and said center of curvature.

3. An afocal objective system comprising a first catoptric element with a reflecting surface of circularly convex cross section, a second catoptric element with a reflecting surface of circularly concave cross section axially aligned with and facing the reflecting surface of said first element, a third catoptric element with a reflecting surface of circularly concave cross section facing the reflecting surface of said second element, and a fourth catoptric element with a reflecting surface of circularly convex cross section axially aligned with and facing the reflecting surface of said third element; said surfaces of concave cross section having focal circles of half their own radius intersecting each other; said first and second elements constituting a first focal pair having an image plane within the zone of intersection of said circles, said third and fourth elements constituting a second focal pair having an image plane substantially coinciding with that of said first pair in a plane whose image, as reflected by each of said surfaces of concave cross section, has a cross section in the shape of a conic section osculating a circle which lies entirely within the circular perimeter of a respective one of said convex cross sections.

4. A system according to claim 3 wherein all of said elements have substantially the same radius of curvature, the common image plane of said pairs being dissymmetrically positioned between said concave surfaces.

5. An anamorphotic objective system comprising a first cylindrical element with a circularly convex reflecting surface, a second cylindrical element with a circularly concave reflecting surface axially aligned with and facing the reflecting surface of said first element, a third cylindrical element with a circularly concave reflecting surface facing the reflecting surface of said second element, and a fourth cylindrical element with a circularly convex reflecting surface axially aligned with and facing the reflecting surface of said third element; said concave surfaces having focal circles of half their own radius intersecting each other; said first and second elements constituting a first focal pair having an image plane within the zone of intersection of said circles, said third and fourth elements constituting a second focal pair having an image plane substantially coinciding with that of said first pair in a plane whose image, as reflected by each of said concave surfaces, has a cross section in the shape of a conic section osculating a circle which lies entirely within the circular perimeter of a respective one of said convex surfaces.

6. A system according to claim 5 wherein all of said elements share a common axial plane.

References Cited in the file of this patent

UNITED STATES PATENTS

| | | |
|---|---|---|
| 2,380,887 | Warmisham | July 31, 1945 |
| 2,520,634 | Grey | Aug. 29, 1950 |
| 2,737,850 | Raitiere | Mar. 13, 1956 |
| 2,741,691 | Lee | Apr. 10, 1956 |
| 2,769,373 | Bouwers | Nov. 6, 1956 |
| 2,786,387 | Belok | Mar. 26, 1957 |
| 2,869,423 | Hoge et al. | Jan. 20, 1959 |

FOREIGN PATENTS

| | | |
|---|---|---|
| 1,137,322 | France | Jan. 14, 1957 |